Patented May 6, 1952

2,595,400

UNITED STATES PATENT OFFICE 2,595,400

POLYMERIC POLYUREAS

John T. Maynard, Wilmington, Del., assignor to E. I. du Pont de Nemours & Company, Wilmington, Del., a corporation of Delaware No Drawing. Application April 26, 1950, Serial No. 158,323

9 Claims. (Cl. 260—77.5)

This invention relates to polymeric products and more particularly to new polymeric polyureas.

Polymeric polyureas and polythioureas, wherein one or both of the nitrogens of the urea and thiourea groups are contained as intralinear substituents in the polymer chain, are known in the art. Examples of such compounds wherein one of the nitrogens is an intralinear member of the main polymer chain are described in U. S. Patents 2,222,208, 2,257,162 and 2,284,896. These polyureas, which are prepared from ethylene imine type polymers, are not as satisfactory as is desired since they are particularly sensitive to hydrolysis in basic media.

Examples of those polymers wherein both the nitrogens of the urea and thiourea groups are intralinear members of the main polymer chain are broadly disclosed in U. S. Patents 2,130,948, 2,292,443, 2,313,871 and 2,201,172. These polymers are high melting solids, generally insoluble in most solvents except the strong acids. Although useful in some outlets demanding strength and solvent resistance, they are not readily handleable because of their poor solubility characteristics.

It is an object of this invention to provide new polymeric products. A further object is to provide new polymeric polyureas. A still further object is to provide new polymeric polyureas wherein the urea groups are present solely as extralinear substituents. Other objects will appear hereinafter.

The objects of this invention are accomplished by providing a new class of polymeric polyureas in which the recurring urea groups are wholly extralinear. More particularly, these polyureas have a main polymer chain and contain a plurality of recurring wholly extralinear urea units each of which is directly connected by a single bond through one of the nitrogens therein to a saturated aliphatic hydrocarbon radical containing at least three contiguous carbon atoms, at least two of which are integral parts of the main polymer chain, said three contiguous carbon atoms being otherwise attached solely to hydrogen or monovalent saturated aliphatic hydrocarbon radicals of not more than two carbons. The remaining valence of the nitrogen of the urea group, which is directly bonded to the above-described saturated aliphatic hydrocarbon radical, is satisfied by hydrogen or a monovalent aliphatic, including cycloaliphatic, or aromatic radical, and preferably by hydrogen or a hydrocarbon radical of from 1 to 18 carbons. The remaining two valences of the other nitrogen of the extralinear urea groups, i. e., the one furthest removed from the main polymer chain, are satisfied by hydrogen or monovalent, aliphatic, cycloaliphatic, aromatic or heterocyclic radicals free of active hydrogen-containing groups and preferably by solely hydrogen and hydrocarbon radicals of not more than 18 carbon atoms.

The new polymeric polyureas of this invention can also contain hydrocarbon di-radicals in the main polymer chain joining the above-described structural units carrying the extralinear urea groups. These hydrocarbon diradicals can also contain carbonyl carbon and olefinic carbons as intralinear substituents in the main polymer chain as well as carbonyl carbon and cyano carbon as extralinear substituents directly bonded to carbon atoms of the main polymer chain. These new polymeric polyureas can also contain extralinear primary, secondary, or tertiary amine groups singly bonded to the main polymer chain through a chain of 0 to 1 saturated aliphatic carbons. The two remaining valences of these extralinear amine groups, i. e., those valences not used in directly bonding the amine groups to the main polymer unit, can be satisfied by hydrogen or aliphatic, cycloaliphatic or aromatic monovalent hydrocarbon radicals free of aliphatic unsaturation and of from 1 to 18 carbons each, which may be alike or different and in the case where both are aliphatic hydrocarbon radicals may be joined together in a ring preferably of from 5 to 6 ring members in which instance there may be a chalcogen of atomic weight less than 33 present in the ring structure, that is oxygen or sulfur.

These polymeric polyureas can be prepared by converting to extralinear urea groups at least 10% of the extralinear amine groups in a polymeric poly-primary or poly-secondary polyamine. These polymeric poly-primary and poly-secondary polyamines contain at least 1.5% combined amino nitrogen in recurring amino-containing structural units in which the nitrogen atoms are extralinear and in which one of the valences of each nitrogen atom is satisfied by hydrogen, another valence is satisfied by hydrogen or a monovalent, aliphatic, cycloaliphatic, aromatic or heterocyclic radical free of aliphatic unsaturation and preferably solely hydrocarbon of from 1 to 18 carbon atoms, and the remaining valence of the nitrogen is satisfied by a saturated aliphatic hydrocarbon radical containing at least three contiguous carbon atoms, at least two of which are integral parts of the main polymer chain.

These polymeric poly-primary and poly-secondary polyamines can also contain hydrocarbon di-radicals in the main polymer chain joining the above-described structural units carrying the extralinear amine-bearing groups. These hydrocarbon di-radicals can also contain carbonyl carbon and olefinic carbons as an integral part of the main polymer chain, as well as carbonyl carbon and cyano-carbon as extralinear substituents directly bonded to the main polymer chain. These polymeric polyamines are more fully disclosed in U. S. Patents 2,063,148, 2,456,428 and 2,495,255.

The following general description illustrates the preferred manner of preparing the polymeric polyureas of this invention. A slight excess of urea-forming reactant (e. g., cyanic or isocyanic acids, the ammonium, alkali metal and alkaline earth metal cyanates and isocyanates and the orgnic isocyanates) over the amount theoretically required for the desired degree of conversion of the extralinear amine groups to extralinear urea groups is added to a solution of polymeric polyamine in a suitable solvent, for example, liquid hydrocarbons, e. g., benzene; aqueous organic acids, e. g., aqueous acetic acid. The resulting solution is allowed to stand at room temperature when the less reactive urea-forming reactants are used, e. g., the cyanate salts, and is generally cooled during the addition of urea-forming reactant when the latter is more reactive, e. g., the organic isocyanates. It is sometimes desirable to heat the reaction mixture slightly, i. e., from about 50 to 100° C. for a relatively short period of time, e. g., from 1 to 3 hours, to insure completion of the urea-forming reaction. The reaction is rarely allowed to proceed for more than 1 to 2 hours since the formation of the extralinear urea groups occurs so readily; however, longer reaction times, e. g., 3-12 hours or longer, can be used if desired. The polymeric polyureas thus formed generally separate from the solution in the form of powdery solids or as tacky resins depending upon the degree of conversion of the amine groups to urea groups. If the product cannot be isolated by filtration, the reaction solvents and excess urea-forming reactants can be removed by distillation under reduced pressure. In the case of the cyanate and isocyanate salts, any excess of these can be removed from the reaction mixture by repeated water extractions.

The following examples in which the parts given are by weight are submitted to illustrate but not to limit this invention.

*Example I*

A solution of 9.75 parts of potassium cyanate in 40 parts of water is added with rapid stirring over a period of 12 minutes to a solution of 54 parts of an ethylene/carbon monoxide polyamine of neutral equivalent (N. E.) 515 in 250 parts of water and 7.2 parts of glacial acetic acid. The mixture is diluted with an additional 150 parts of water during this addition to facilitate stirring and mixing. The polymeric polyurea separates rapidly. The reaction mixture is stirred for one hour more and let stand for an additional 1½ hours. It is then cooled in an ice bath, and the solid product is removed by suction filtration and washed with water. After being vacuum dried, there is finally obtained 58 parts of cream-colored polyurea as a slightly tacky solid. This polymeric polyurea is soluble in isopropyl alcohol and can be coagulated rapidly by the addition of formaldehyde to such a solution yielding an insoluble, factice-like solid.

The original polymeric polyamine used as the starting material in the preparation of the above product was previously prepared by the reductive amination with ammonia and hydrogen of an ethylene/carbon monoxide polyketone of molecular weight 1650 containing ethylene and carbon monoxide in a 11:1 combined mole ratio. Analyses of this polymeric polyamine indicated it to contain 1.92% primary amino nitrogen by the Van Slyke method and 3.11% total nitrogen by the Dumas procedure—corresponding to the conversion of 75% of the carbonyl oxygen in the starting polyketone to amino nitrogen.

These results indicate that 62% of the nitrogen in the polyamine is primary amino nitrogen and 38% is secondary and/or tertiary amino nitrogen and that the polymeric polyketone has had 47% of its intralinear carbonyl groups converted to extralinear primary amino groups and 28% converted to extralinear secondary and tertiary amino groups. Analytical results obtained on the above described polymeric polyurea prepared from this polymeric polyamine indicate a total nitrogen content of 5.17% by the Dumas procedure. Calculations based on the total nitrogen content of the starting polymeric polyamine (3.11%) indicate that if all the primary and secondary amino nitrogens were converted to extralinear urea groups that the nitrogen content of the product would be 5.7%. Thus, the analytical results indicate the conversion of approximately 91% of the primary and secondary amine groups to extralinear urea groups.

*Example II*

To a solution of 32.5 parts of an ethylene/carbon monoxide poly-primary polyamine in 50 parts of benzene in a glass reactor, is added dropwise with stirring over a period of one hour a solution of 6.6 parts of p-bromophenylisocyanate in 25 parts of benzene. An exothermic reaction occurs and external icewater cooling of the reactor is used to maintain the temperature of the reaction mixture between 25 and 30° C. A solid product separates from the reaction mixture. After all the isocyanate is added, the reaction mixture is heated slowly to 60° C. with stirring. After three hours additional stirring, at 60° C., the benzene solvent is removed by distillation at steam bath temperature first under water-pump vacuum and finally under a pressure corresponding to that of 8 mm. of mercury—all operations being carried out under an atmosphere of nitrogen. There is obtained as a residue 41.5 parts of the polymeric N-poly-methylene N'-p-bromophenyl polyurea as a soft, white wax soluble in glacial acetic acid.

The above starting polymeric, poly-primary, polyamine exhibits a N. E. of 325 and was previously prepared in the manner disclosed by Hoehn Patent No. 2,495,255 by the reductive amination with ammonia of an ethylene/carbon monoxide polyketone of molecular weight 1035 containing ethylene and carbon monoxide in a mole ratio of 4.6:1. The quantities of the polyamine and the p-bromophenylisocyanate used in the above-described reaction are so calculated that, in theory, ⅓ of the extralinear amine groups in the polyamine should be converted to p-bromophenyl-substituted extralinear urea groups. Assuming complete conversion, the end product should contain 6.8% bromine and exhibit a N. E. of 587. Analytical results carried out on the above-described polymeric N-polymethylene-N'-p-bromophenyl polyurea show the product to contain on the average 6.78% bromine and to exhibit an average N. E. of 576, thus, indicating practical completion of the desired reaction. In other words, the final N-p-bromophenyl polyurea is a polymeric polyamine-polyurea, wherein 1/3 of the extralinear amine groups have been converted to extralinear N-p-bromophenylurea groups.

Similar results were obtained utilizing polymeric polyamines of N. E. 277, obtained by the reductive amination of an ethylene/carbon monoxide polyketone of molecular weight 1500 containing ethylene and carbon monoxide in a 4.5:1 mole ratio, and of N. E. 503, obtained by the reductive amination with ammonia of an ethylene/carbon monoxide polyketone of molecular weight 3260 containing ethylene and carbon monoxide in a 11.9:1 mole ratio.

*Example III*

A solution of 9.75 parts of potassium cyanate in 40 parts of water is added at room temperature with rapid stirring over a period of 15 minutes to a solution of 30 parts of a polymeric polyamine prepared by the reduction of a butadiene/methacrylonitrile copolymer in 300 parts of water and 7.2 parts of glacial acetic acid. During the time of addition, the polyurea formed separates from solution. The mixture is stirred for an additional hour and the water then decanted. The solid material then remaining is washed by being stirred in 200 parts of fresh water for 10 minutes and the polymeric polyurea removed by suction filtration. After drying in a vacuum desiccator, there is obtained 35 parts of polyurea as a cream-colored resinous solid. This polymeric polyurea is soluble in isopropyl alcohol. The addition of even small amounts of formaldehyde to such a solution causes the rapid formation and subsequent precipitation of an insoluble polyurea-formaldehyde resin.

The starting polymeric polyamine had been previously prepared by the catalytic reduction in the presence of about 10% liquid ammonia of a butadiene/methacrylonitrile copolymer. This polymeric polyamine product exhibits a N. E. of 300, an iodine number of 101, a molecular weight of 1950, and contains 4.79% total nitrogen (Kjeldahl) and 3.62% primary-amino nitrogen (Van Slyke). The starting butadiene/methacrylonitrile copolymer had been previously prepared by the free radical catalyzed copolymerization of 4 parts of butadiene with one part of methacrylonitrile and contained 5.28% total nitrogen (Kjeldahl) and exhibited an iodine number of 283 and a molecular weight of 1050.

Results calculated on the basis of the total nitrogen content of the starting polymeric polyamine (4.79%) indicate that if all the primary and secondary amino nitrogens in the original polymeric polyamine (i. e., the reduced butadiene/methacrylonitrile copolymer) were converted to extralinear urea groups that the nitrogen content of the product should be 8.41%. The actual analytical results (7.46% total nitrogen, Dumas) indicate a conversion of approximately 89% of the extralinear amine groups in the starting polyamine to extralinear polyurea groups.

*Example IV*

A solution of one part of potassium cyanate in 20 parts of water is added at room temperature with rapid stirring over a period of 15 minutes to a solution of 7 parts of a styrene/methyl vinyl ketone polymeric polyamine containing 1.78% primary amino nitrogen and 0.75 part of acetic acid in 200 parts of water. The mixture is stirred for an additional hour, and the polyurea product precipitated out of solution is removed by suction filtration. This product is washed by being stirred with 100 parts of water in a high speed, mechanical, cutting type mixer. The product is removed from the resulting mixture by suction filtration and finally vacuum dried. There is thus obtained 6.5 parts of a polymeric polyurea from the styrene/methyl vinyl ketone polyamine. This product is soluble in isopropyl alcohol and the addition of a small quantity of formalin to such a solution causes the rapid formation and precipitation of an insoluble polyurea-formaldehyde resin.

The starting polymeric polyamine had been previously prepared by the catalytic reductive amination of a styrene/methyl vinyl ketone copolymer and contains 1.78% primary amino nitrogen (Van Slyke). The starting styrene/methyl vinyl ketone copolymer had been prepared by the free radical catalyzed copolymerization of 2 parts of styrene with one part of methyl vinyl ketone and contained 24% combined methyl vinyl ketone. Based on the primary amino nitrogen content of the starting polymeric polyamine (1.78%), the complete conversion of all primary amine groups to extralinear urea groups would require the end product polymeric polyurea to contain 3.38% nitrogen. Analyses (Dumas) indicate the polymeric polyurea to contain 3.91% total nitrogen.

That the polyurea product apparently contains a higher per cent of nitrogen than called for is due to the fact that the starting polymeric polyamine contains combined nitrogen in other forms than primary amino groups. Research in the reductive amination of ketone polymers shows that under the conditions necessary for successful amination, i. e., a catalyst, hydrogen, ammonia, and relatively high operating temperatures, some of the primary amino groups once formed cyclize to secondary and possibly even tertiary amine groups. The Van Slyke nitrogen analysis would only uncover the primary amino groups present in the polymer. However, any secondary amine groups present would also react with the cyanate salt used in this particular reaction to form an N,N-di-substituted extralinear urea group. Thus, the high nitrogen value found indicates that the product contains both extralinear, mono-substituted urea groups and extralinear N,N-di-substituted urea groups wherein the mono- and di-substitution are on the nearer nitrogens of the extralinear urea groups, i. e., nearest the main polymer chain.

*Example V*

A solution of 1.95 part of potassium cyanate in 20 parts of water is added at room temperature with rapid stirring over a period of 15 minutes to a solution of 5 parts of a butadiene/methyl vinyl ketone polymeric polyamine containing 5.52% primary amino nitrogen and 1.5 parts of glacial acetic acid in 100 parts of water. The mixture is stirred for an additional hour, and the polyurea product precipitated out of solution is removed by suction filtration. This product is washed by being stirred with 150 parts of water in a high speed, mechanical, cutting type mixer.

The product is removed from the resulting mixture by suction filtration and finally vacuum dried. There is thus obtained 3.1 parts of a polymeric polyurea from the butadiene/methyl vinyl ketone polyamine. This product is soluble in isopropyl alcohol, and the addition of a small quantity of formalin to such a solution causes the rapid formation and precipitation of an insoluble polyurea/formaldehyde resin.

The starting polymeric polyamine had been previously prepared by the catalytic reductive amination of a butadiene/methyl vinyl ketone copolymer and contained 5.52% primary amino nitrogen (Van Slyke) and exhibited an iodine number of 12.4. The starting butadiene/methyl vinyl ketone copolymer had been prepared by the free radical catalyzed copolymerization of 4 parts of butadiene with one part of methyl vinyl ketone and exhibited a carbonyl number of 143 and a molecular weight of 954. Based on the primary amino nitrogen content of the starting polymeric polyamine (5.52%), the complete conversion of all primary amine groups to extralinear urea groups would require the end product polymeric polyurea to contain 9.42% nitrogen. Analyses carried out on the polymeric polyurea product indicate this material to contain 6.54% total nitrogen. These results indicate the conversion of approximately 70% of the extralinear primary amine groups in the starting polymeric polyamine obtained by the reductive amination of a 4:1 butadiene/methyl vinyl polyketone copolymer to extralinear urea groups.

*Example VI*

A solution of 9.1 parts of ammonium thiocynate in 15 parts of water is added with rapid stirring to a solution of 52.3 parts of an ethylene/carbon monoxide polyamine containing 3.19% total nitrogen (Dumas), in 500 parts of water and 7.2 parts of glacial acetic acid. The polymeric polythiourea precipitates rapidly. The reaction mixture is stirred for an additional three hours and the supernatant, clear solution removed by decantation. The residue is washed with water and then taken up in 350 parts of isopropyl alcohol. A portion of this slightly cloudy solution is concentrated to dryness under vacuum. There is thus obtained a polymeric polythiourea as an amber, tacky resin. Samples of this material upon analysis are found to contain 4.6% sulfur. Based on the total nitrogen in the starting polymeric polyamine, the polymeric polythiourea should contain 6.4% sulfur provided all of the amine groups were converted to thiourea groups. These results indicate the conversion of approximately 71% of the amine groups to extralinear thiourea groups.

*Example VII*

A solution of 5.45 parts of allyl isothiocyanate in 18 parts of petroleum ether of boiling range 60–71° C. is mixed with a solution of 19.85 parts of an ethylene/carbon monoxide polymeric polyamine (N. E. = 397) in 140 parts of the above petroleum ether. The reaction mixture is heated at 60–65° C. for 15 minutes during which time a viscous oil precipitates. The reaction solvent is then removed by distillation at atmospheric pressure on a steam bath. The amber, viscous, oily, residue (insoluble in water and dilute aqueous hydrochloric acid) is washed 4 times by decantation with warm portions of the above petroleum ether to remove any unreacted amine or allyl isocyanate. The residue obtained from this washing is rinsed with methylene chloride and the residual wash solvents are removed by heating on a steam bath and finally allowing the resinous product to stand in a vacuum desiccator over phosphorus pentoxide. There is thus obtained from the ethylene/carbon monoxide polyamine 14.4 parts (57% of theory) of a polymeric N-allyl-N'-alkanyl thiourea as an amber, very viscous oil insoluble in water. Analyses indicate this product to contain an average of 7.22% N (Kjeldahl) and 7.39% S (Parr). These results indicate a polymer unit weight of 432 containing extralinear N-allyl thiourea groups.

The original polymeric polyamine used as the starting material in the preparation of the above-described N-substituted extralinear polymeric polythiourea had been previously prepared in the manner disclosed in Hoehn Patent No. 2,495,255 by the catalytic reductive amination with ammonia of an ethylene/carbon monoxide polyketone of molecular weight 600 containing ethylene and carbon monoxide in a combined mole ratio of 6:1.

As has been illustrated by the preceding examples, the products of this invention constitute polymeric polyureas wherein the urea groups are solely extralinear and are singly bonded directly through one of the urea nitrogens to saturated aliphatic carbon which is an integral part of the main polymer chain or directly bonded extralinearly thereto. These polymeric polyureas can contain hydrogen or an alphatic, cycloaliphatic or aromatic hydrocarbon radical free of aliphatic unsaturation and of from 1 to 18 carbons on the urea nitrogens directly bonded to said aliphatic carbon. The two remaining valences of the urea nitrogens of the extralinear urea groups furthest removed from the main polymer chain, i. e., those valences in addition to the one utilized in forming the urea group are satisfied by hydrogen, aliphatic, cycloaliphatic, aromatic, aliphatic aromatic, or aromatic aliphatic radicals, alike or different, and preferably solely hydrocarbon and of from 1 to 18 carbons. In those instances wherein these two valences are both satisfied by aliphatic radicals, the latter can be together joined in a ring preferably of 5 to 6 ring members in which instance there may be a chalcogen of atomic weight less than 33, i. e., oxygen or sulfur present in the ring in addition to the said urea nitrogen. Thus, the extralinear urea groups in the polymeric polyureas of this invention may have as many as 3 substituents, preferably solely hydrocarbon, of from 1 to 18 carbons each, in addition to the main polymer chain, bonded to the two nitrogens of each extralinear urea group.

These radicals can contain substituent groups free from reactive hydrogens. Examples of such groups include alkoxy, aryloxy, cycloalkoxy groups as well as aromatic halogens, i. e., halogens such as chlorine, bromine and fluorine, directly bonded to a carbon of an aromatic ring. For reasons of complicated side reactions and readier availability of the intermediates, those products are preferred wherein the nitrogen of the extralinear urea groups closest to the main polymer chain carries hydrogen or an aliphatically saturated aliphatic, cycloaliphatic, or aromatic hydrocarbon radical of from 1 to 18 carbons, and the nitrogen of the extralinear urea groups furthest removed from the main polymer chain carry hydrogen or solely hydrocarbon radicals or from 1 to 18 carbons.

Extralinear polymeric polythioureas can be prepared from the same reactants substituting only the closely related thiocyanates and isothiocyanates, for instance, for the cyanates and isocyanates. These polymeric products possess the same structure previously discussed for the extralinear polymeric polyureas with the exception that the oxygen of the extralinear urea groups is sulfur. In other words, the oxocarbonyl fragments of the extralinear urea groups are thiocarbonyl groups.

A convenient method for preparing these products lies in the conversion to extralinear urea or thiourea groups of primary and secondary amine groups in polymeric poly-primary and poly-secondary polyamines wherein the amine groups are solely extralinear to the main polymer chain. More particularly, these products can be readily prepared by converting to extralinear urea or thiourea groups the primary and secondary amine groups in polymeric poly-primary and poly-secondary polyamines containing recurring structural units wherein the nitrogen atoms are solely extralinear and are bonded directly to aliphatic carbon which is an integral unit of the main polymer chain or extralinearly bonded directly thereto. Furthermore, one of the three valences of said extralinear nitrogen atoms is satisfied by hydrogen, another valence is satisfied by hydrogen or a monovalent aliphatic, cycloaliphatic, or aromatic hydrocarbon radical free from aliphatic unsaturation and of from 1 to 18 carbons, and the third and remaining valence of the nitrogen (i. e., the one linking the extralinear nitrogen to the main chain of the polymer) is satisfied by a hydrocarbon radical containing at least three contiguous aliphatic carbon atoms at least two of which are integral parts of the main polymer chain, said three contiguous carbon atoms carrying only hydrogen or monovalent saturated aliphatic hydrocarbon radicals of no more than two carbons.

These starting polymeric poly-primary and polymeric poly-secondary polyamines can also contain either or both carbonyl carbon and olefinic carbon as an integral part of the main polymer chain as well as either or both carbonyl carbon and cyano carbon as extralinear substituents directly bonded to the main polymer chain. These polymeric poly-primary and polymeric poly-secondary polyamines can also contain hydrocarbon di-radicals in the chain joining the plurality of the above-defined extralinear primary or secondary amine groups. The hydrocarbon residues directly joining the above-defined extralinear primary or secondary amine groups as integral members of the main polymer chain can contain olefinic carbon directly in the chain and in addition can carry as extralinear substituents directly bonded to the main carbon chain hydrogen and monovalent aliphatic or aromatic groups, preferably solely hydrocarbon.

Thus, these polyamines comprise reduced acrylonitrile and methacrylonitrile polymers and copolymers with other polymerizable ethylenically unsaturated compounds, as well as the products of the reductive amination with ammonia or primary amines of polymeric polyketones; such as those prepared by: the polymerization of olefinically unsaturated ketones such as methyl vinyl ketone; the copolymerization of these olefinically unsaturated ketones with other polymerizable olefinically unsaturated monomers such as styrene; and the copolymerization of 2 to 4 carbon monoolefins such as ethylene with carbon monoxide. These starting polymeric poly-primary and poly-secondary polyamines as well as their preparation are disclosed in greater detail in U. S. Patents 2,063,158, 2,456,428 and 2,495,255.

The polymeric polyureas and polythioureas derived from the monoolefin/carbon monoxide polyamines have a main polymer chain consisting solely of carbon atoms and contain as lateral substituent groups a plurality of urea or thiourea groups with the urea or thiourea nitrogens attached solely to members of the class consisting of hydrogen and organic radicals free of reactive hydrogens and of no more than 18 carbons each and preferably solely hydrocarbon and having one of the nitrogens of each of said urea or thiourea groups directly attached by a single bond to a carbon atom which is an integral part of said main carbon chain. The preferred polymeric polyureas of this type are derived from ethylene-carbon monoxide polyamines and contain recurring structural units of the formula

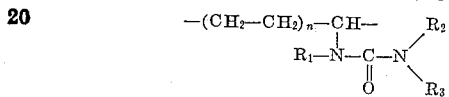

where $n$ is a positive integer from 1 to 150 and preferably from 1.5 to 10.0, $R_1$ is hydrogen or a monovalent aliphatically saturated hydrocarbon radical of from 1 to 18 carbon atoms, and $R_2$ and $R_3$ are hydrogen or hydrocarbon radicals of not more than 18 carbon atoms. The preferred polymeric polythioureas of this type contain structural units of the above formula wherein sulfur is substituted for oxygen. These polymeric polyureas and polythioureas also can contain carbonyl carbon in the chain of carbon atoms comprising the main polymer chain and amino nitrogen carrying solely hydrogen or aliphatically saturated hydrocarbon radicals of from 1 to 18 carbons as lateral substituents with the nitrogen thereof directly bonded by a single bond to a carbon atom of the main carbon chain.

The polymeric polyureas and polythioureas derived from acrylonitrile and alkacrylonitrile polymers and copolymers contain a linear polymeric hydrocarbon chain to which urea or thiourea groups are attached through a methylene carbon atom. The preferred polymeric polyureas of this type contain recurring structural units of the formula

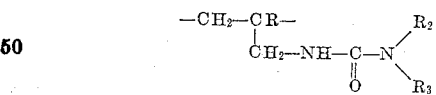

wherein $R_2$ and $R_3$ are hydrogen or hydrocarbon radicals of not more than 18 carbon atoms, and R is hydrogen or an alkyl group of 1 to 4 carbon atoms, preferably hydrogen or methyl. The preferred polymeric polythioureas of this type contain structural units of the above formula wherein sulfur is substituted for oxygen. These polymeric polyureas and polythioureas also can contain unreduced acrylonitrile and alkacrylonitrile units and thus can contain cyano-carbon as an extralinear substituent directly bonded to a carbon of the main carbon chain. They can also contain primary amino methyl groups attached to the main carbon chain. These polymeric polyureas and polythioureas can also include as members of the main polymer chain separating the above described urea and thiourea groups the polymeric units of any polymerizable vinylidene compound, particularly polymerizable vinylidene hydrocarbons such as the 1,3-diene hydrocarbons as 1,3-butadiene.

The polymeric polyureas and polythioureas derived from the reductively aminated vinyl ketones contain a linear polymeric hydrocarbon chain to which urea or thiourea groups are attached through an aliphatic carbon atom. The preferred polymeric polyureas of this type contain recurring structural units of the formula

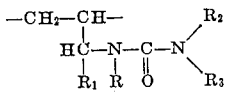

wherein $R_1$ is hydrogen or a monovalent saturated aliphatic hydrocarbon radical, preferably of 1 carbon atom, $R_2$ and $R_3$ may be alike or different and are hydrogen or organic radicals free of reactive hydrogens and containing not more than 18 carbon atoms and R is hydrogen or a monovalent hydrocarbon radical free of aliphatic unsaturation and containing from 1 to 18 carbon atoms. The preferred polymeric polythioureas of this type contain structural units of the above formula where sulfur is substituted for oxygen. These polymeric polyureas and polythioureas also can contain extralinear carbonyl carbon directly attached to a carbon atom of the main polymer chain and also amino nitrogen attached through an aliphatic carbon atom to the main carbon chain, said amino nitrogen carrying solely hydrogen or monovalent hydrocarbon radicals free of aliphatic unsaturation and from 1 to 18 carbons.

The most preferred polymeric polyureas of the above types contain recurring structural units of the following formulas:

(I) 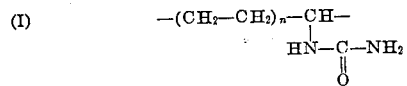

wherein $n$ is a positive integer from 1 to 150, and preferably from 1.5 to 10.0.

(II) 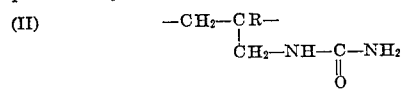

wherein R is hydrogen or methyl.

(III) 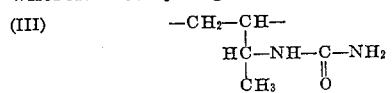

The most preferred polymeric polythioureas contain recurring structural units of the above formulas where sulfur is substituted for oxygen.

A convenient method of converting the extralinear primary and secondary amine groups of these polyamines to urea or thiourea groups resides in the reaction of these extralinear polymeric poly-primary and poly-secondary polyamines with cyanic or thiocyanic acids and their salts, particularly the ammonium, and alkali metal and alkaline earth metal salts, and their known organic esters. In this connection it should be pointed out that both these compounds, i. e., cyanic and thiocyanic acids, as well as their salts and esters, are believed to exist in tautomeric forms of varying degrees of stability. Thus, some of the compounds are believed to exist in only one form and some in two forms which in some cases are indistinguishable.

More specifically, cyanic acid is believed to exist in two forms, i. e., cyanic and isocyanic acids, but at temperatures above 0° both forms spontaneously polymerize to the cyclic trimers, cyamelide and cyanuric acid. These, upon heating, revert to the corresponding monomers which in turn trimerize, etc. The ammonium, alkali metal and alkaline earth metal salts are also believed to exist in two tautomeric forms, i. e., the cyanates and isocyanates. On the other hand, the organic esters of the acid are believed to exist only in the iso form, i. e., the organic isocyanates.

Much the same holds true for the corresponding sulfur analogues, thiocyanic acid and its salts and esters. However, in the case of this compound and its salts, there is some doubt as to the stable existence of the iso forms of the acid and its salts, i. e., isothiocyanic acid and its salts. Thiocyanic acid and its ammonium, alkali metal and alkaline earth metal salts are known and in some instances give evidence of reaction in the iso form. The esters of both forms of the acid are known and are relatively stable, i. e., the organic thiocyanates and isothiocyanates.

Thus, the reactants which can be used to convert the extralinear primary and secondary amine groups to urea or thiourea groups by this type reaction are: cyanic acid and its salts in both tautomeric forms and the esters of isocyanic acid, or thiocyanic acid and its salts, both possibly in the tautomeric isothiocyanic form, and the esters of both forms of the acid, i. e., the organic thiocyanates and isothiocyanates.

Obviously, when it is desired to convert the primary and secondary extralinear amine groups in the starting polymeric polyamines to urea groups, cyanic acid and its salts or esters in one or other of the possible forms should be used. Because of their greater stability and readier availability, it is preferred to use the ammonium and alkali metal cyanates and the organic isocyanates. Conversely, when it is desired to convert the extralinear amine groups in the starting polymeric poly-primary and poly-secondary polyamines to thiourea groups, thiocyanic acid or its salts or esters in one or more of the isomeric forms should be used. Because of their readier availability and relative stability, it is preferred to use the ammonium and alkali metal and alkaline earth metal thiocyanates and the organic thiocyanates and isothiocyanates.

It should be pointed out that reaction with the above acids and their salts in either form can only lead to the production of extralinear urea or thiourea groups wherein the nitrogen farthest removed from the polymer chain carries solely hydrogen. On the other hand reaction with the organic esters of the acids in either form can only lead to the formation of extralinear urea and thiourea groups wherein the nitrogen farthest removed from the polymer chain carries one hydrogen and as a substituent radical the alcohol fragment of the starting ester.

Obviously, this type reaction can be applied equally well to the previously described poly-primary and poly-secondary polyamines. In the first instance, the nitrogen of the urea or thiourea group nearest to the main polymer chain, i. e., directly bonded to aliphatic carbon at most once removed from the main polymer chain, will also carry hydrogen. In the latter instance this same nitrogen will carry as a substituent radical the radical carried on the extralinear nitrogen of the starting secondary amine.

The esters of isocyanic, thiocyanic, and isothiocyanic acids useable in preparing the above type of N-substituted polyureas or polythioureas are those with aliphatic, including cycloaliphatic and heterocyclic, aromatic, aliphatic aromatic, or aromatic aliphatic alcohols which may carry, in addition to the single alcoholic hydroxyl, substituent radicals free of reactive hydrogens. Examples of such radicals include, of course, alkyl, alkenyl, alkoxy, alkenoxy, halogen, such as chlorine or bromine bonded either to aliphatic or aromatic carbon, nitro groups, and the like. Specific examples of these esters are: saturated short-chain aliphatic esters such as methyl isocyanate, saturated long-chain aliphatic esters such as octadecyl isocyanate, highly branched long-chain saturated aliphatic esters such as 3,5,5-trimethylhexyl isocyanate, unsaturated aliphatic esters such as allyl isothiocyanate, and allyl thiocyanate, unsubstituted aromatic esters such as phenyl isothiocyanate, substituted aromatic esters such as o-chlorophenyl, p-nitrophenyl and p-chlorophenyl isocyanates; aromatic aliphatic esters such as benzyl isothiocyanate; aliphatic aromatic esters such as p-tolyl isocyanate; and heterocyclic esters such as tetrahydrofurfuryl isocyanate.

Using these above specific esters and the previously described polymeric poly-primary and/or poly-secondary polyamines, the polymeric polyureas thereby prepared will be those whose structures have been previously discussed in some detail in columns 10 and 11, where $R_2$ and $R_3$ are, respectively: methyl and hydrogen; octadecyl and hydrogen; 3,5,5-trimethylhexyl and hydrogen; allyl and hydrogen; o-chlorophenyl and hydrogen; p-nitrophenyl and hydrogen; p-chlorophenyl and hydrogen; p-tolyl and hydrogen; tetrahydrofurfuryl and hydrogen.

It is not necessary that the polyureas and polythioureas be prepared in the manner described above. For instance, the starting polymeric poly-primary or poly-secondary polyamine can be reacted with haloformic or halothionformic acid esters to form the corresponding polymeric polyurethane or thionurethane. This, in turn, can be readily converted by reaction with ammonia or a primary or secondary amine to form the corresponding polyurea or polythiourea carrying, respectively, on the outermost nitrogen (i. e., the one furthest removed from the main polymer chain) of the extralinear urea or thiourea groups two hydrogens, or one hydrogen and as a substituent radical the radical of the primary amine, or no hydrogens and as substituent radicals the two radicals of the secondary amine.

Another possible route to the polymeric polyureas and polythioureas described herein resides in the direct condensation of the polymeric poly-primary and poly-secondary polyamines previously discussed with a urea or a thiourea. In this condensation, which is preferably carried out at elevated temperatures and in the presence of a nonreactive organic liquid reaction medium, ammonia (or at the higher temperatures a primary or secondary monomeric amine) is liberated presumably between the extralinear amine group of the polyamine and one of the terminal nitrogens of the urea or thiourea being used. A substituted or unsubstituted urea or thiourea may be used with both the extralinear poly-primary or poly-secondary polyamines.

For reasons of easier and more complete reaction at lower temperatures with no attendant decomposition of the polyamine, it is preferred that the extralinear nitrogen of the polyamine and one of the nitrogens of the urea or thiourea being used together carry a total of three hydrogens. Thus, if a polymeric poly-secondary polyamine is being used, one of the nitrogens of the condensing urea or thiourea preferably carries two hydrogens. However, if a polymeric poly-primary polyamine is being used, there is no preference in reactivity between those condensing ureas or thioureas having one or two hydrogens on one of the nitrogens. In both instances, the other nitrogen of the condensing urea of thiourea may carry two hydrogens, or one hydrogen and a substituent radical, or no hydrogens and two substituent radicals. Presumably the nitrogen of the condensing urea or thiourea which carries the most hydrogens will be the one acting in the condensation with the extralinear primary or secondary amine of the starting polymeric polyamine.

Still another possible route to the polymeric polyureas and polythioureas described herein lies in the direct condensation of the polymeric poly-primary or poly-secondary polyamines with carbamyl or thiocarbamyl halides, particularly the chlorides, with concomitant liberation of hydrohalic acid. Such condensations are particularly suitable for the preparation of polymeric polyureas and poly thioureas wherein the outermost nitrogens of the urea or thiourea groups (i. e., the nitrogen in each group furthest removed from the main polymer chain) carries two substituent radicals. For instance, when N,N-dimethylcarbamyl chloride is used, a polymeric polyurea is prepared wherein the extralinear urea groups carry two methyl substituents on the outermost nitrogen of the urea linkage.

Similar type condensations may also be carried out between the polymeric poly-primary or poly-secondary polyamines and carbamic or thiocarbamic acid esters with concomitant formation of a polymeric polyurea or polythiourea and the alcohol corresponding to the ester group of the carbamic or thiocarbamic acid ester used. This latter route is equally effective in the preparation of polymeric polyureas and thioureas wherein the outermost nitrogens of the extralinear urea or thiourea groups carry two hydrogens, or one hydrogen and as a substituent radical the organic radical directly attached to the nitrogen in the mono-substituted carbamic acid ester, or two substituent radicals, i. e., those attached to the nitrogen in the disubstituted carbamic or thiocarbamic acid ester employed.

The polyureas and polythioureas described herein can be prepared from polymeric polyamines which contain both extralinear primary and secondary amine groups simultaneously. Also the polyureas and polythioureas can be prepared from mixtures of the various polyamines disclosed herein. The polyureas and polythioureas can also be prepared from the previously described polyamines containing either extralinear poly-primary or poly-secondary amine groups or both simultaneously as well as mixtures of these separate type polyamines with mixtures of the various agents previously described as efficacious for carrying out the conversion of these amine groups to the urea or thiourea groups.

The polymeric polyureas and polythioureas disclosed herein wherein one of the nitrogens carries at least one hydrogen can be reacted with formaldehyde to prepare new and useful resins of particular efficacy in improving the water repellency of the natural and synthetic fibers and fabrics. The polyureas and polythioureas wherein all the nitrogens are substituted are useful as textile sizes and lubricants, as adhesives and when of sufficiently high molecular weight as film-forming compositions for coatings.

The polyureas and polythioureas disclosed herein, especially the polymeric polyureas from the polymeric poly-primary polyamines, are particularly useful as agents for improving the water repellency of the natural and synthetic fibers and the fabrics prepared therefrom. These polymeric polyureas can be applied to the fiber or fabrics per se. However, for markedly improved water repellency it is preferred to first treat the fiber or fabric being used with the polymeric poly-primary polyamine (usually in solution in an indifferent organic solvent) and then to expose the thus treated fabric or fiber with one of the previously described esters, particularly the isocyanates (again usually in solution in an inert organic solvent). By this procedure the polymeric polyureas or polythioureas are formed in situ on the fabrics and fibers being treated.

It has been found to be preferable to treat the material involved first with the polymeric poly-primary polyamine and then with the isocyanate ester since in this order of reaction the degree of penetration, the amount of polymeric polyurea formed, and the water repellency thereby engendered are all markedly improved. This is presumably due to the substantivity of the polymeric polyamine to the fibers and fabrics being treated.

For instance, undyed squares of cotton sateen fabric are impregnated with 4% by weight of the fabric of a polymeric poly-primary polyamine (of N. E. 294.4 and molecular weight 3190 and obtained by the reduction of a 5/1 butadiene/methacrylonitrile copolymer) by immersion at room temperature in a 4% solution of the polyamine in 4% acetic acid. The impregnated fabrics are removed from the solution, air dried, refluxed in toluene for two hours to remove any absorbed water, then treated at the reflux for three hours with a 4% solution of p-bromophenyl isocyanate in toluene. At the end of this time the squares of fabric are removed from the toluene solution, air-dried and washed. After three washes, they exhibit a spray rating, i. e., a water repellency rating of 90+ and after nine washes, a rating of 70 on the same scale. A control sample of fabric treated only with the p-bromophenyl isocyanate exhibits a spray rating of only 50 after three washes and an untreated control sample a value of only 0. The details of this water repellency or spray rating test as well as the washing procedures involved are given in detail in U. S. Patent 2,495,283.

As many apparently widely different embodiments of this invention may be made without departing from the spirit and scope thereof, it is to be understood that this invention is not limited to the specific embodiments thereof except as defined in the appended claims.

I claim:

1. A polymeric polyurea having a main polymer chain consisting of contiguous carbon atoms and containing as recurring structural units (a) groups containing at least three contiguous carbon atoms of which one is directly connected by a single bond to an extralinear amino nitrogen having hydrogen attached thereto, at least the next two contiguous carbon atoms being an integral part of the main polymer chain, the remaining valence of said amino nitrogen being satisfied solely by a member selected from the class consisting of hydrogen and saturated aliphatic hydrocarbon radicals of 1 to 18 carbon atoms, and (b) groups containing at least three contiguous carbon atoms of which one is directly connected by a single bond to a wholly extralinear urea unit through one of the nitrogens therein, at least the next two contiguous carbon atoms being an integral part of the main polymer chain, said contiguous carbon atoms in each of said groups (a) and (b) being saturated aliphatic and otherwise attached solely to members of the class consisting of hydrogen and monovalent saturated aliphatic hydrocarbon radicals of not more than two carbon atoms.

2. A polymeric polyurea having a main polymer chain consisting of contiguous carbon atoms and containing as recurring structural units (a) groups containing at least three contiguous carbon atoms of which one is directly connected by a single bond to an extralinear amino nitrogen having hydrogen attached thereto, each of said three contiguous carbon atoms being an integral part of the main polymer chain, the remaining valence of said amino nitrogen being satisfied solely by a member selected from the class consisting of hydrogen and saturated aliphatic hydrocarbon radicals of 1 to 18 carbon atoms, and (b) groups containing at least three contiguous carbon atoms of which one is connected by a single bond to a wholly extralinear urea unit through one of the nitrogens therein, each of said three contiguous carbon atoms being an integral part of the main polymer chain, said contiguous carbon atoms in each of said groups (a) and (b) being saturated aliphatic and otherwise attached solely to members of the class consisting of hydrogen and monovalent saturated aliphatic hydrocarbon radicals of not more than two carbon atoms.

3. A polymeric polyurea having a main polymer chain consisting of contiguous carbon atoms and containing as recurring structural units (a) groups containing at least three contiguous carbon atoms of which one is extralinear and is directly connected by a single bond to an extralinear amino nitrogen having hydrogen attached thereto, the next two contiguous carbon atoms being an integral part of the main polymer chain, the remaining valence of said amino nitrogen being satisfied solely by a member of the class consisting of hydrogen and saturated aliphatic hydrocarbon radicals of 1 to 18 carbon atoms, and (b) groups containing at least three contiguous carbon atoms of which one is extralinear and is directly connected by a single bond to a wholly extralinear urea unit through one of the nitrogens therein, the next two contiguous carbon atoms being an integral part of the main polymer chain, said contiguous carbon atoms in each of said groups (a) and (b) being saturated aliphatic and otherwise attached solely to members of the class consisting of hydrogen and monovalent saturated aliphatic hydrocarbon radicals of not more than two carbon atoms.

4. A polymeric polyurea having a main polymer chain consisting of contiguous carbon atoms and containing as recurring structural units (a) groups containing at least three contiguous carbon atoms of which one is directly connected by a single bond to an extralinear amino nitrogen having hydrogen attached thereto, each of said three contiguous carbon atoms being an integral part of the main polymer chain, being saturated aliphatic and otherwise attached solely to hydrogen, the remaining valence of said amino nitrogen being satisfied solely by a member selected from the class consisting of hydrogen and saturated aliphatic hydrocarbon radicals of 1 to 18 carbon atoms and (b) groups having the following formula

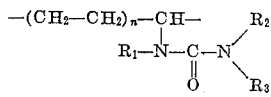

wherein $n$ is a positive integer from 1 to 150, $R_1$ is a member selected from the class consisting of hydrogen and saturated aliphatic hydrocarbon radicals of 1 to 18 carbon atoms, and $R_2$ and $R_3$ are members selected from the class consisting of hydrogen and hydrocarbon radicals of not more than 18 carbon atoms.

5. A polymeric polyurea having a main polymer chain consisting of contiguous carbon atoms and containing as recurring structural units (a) groups containing three contiguous carbon atoms of which one is extralinear and is directly connected by a single bond to an extralinear amino nitrogen having its free valences satisfied solely by hydrogen, the next two contiguous carbon atoms being an integral part of the main polymer chain, each of said three contiguous carbon atoms being saturated aliphatic and otherwise attached solely to members of the class consisting of hydrogen and monovalent saturated aliphatic hydrocarbon radicals of not more than two carbon atoms, and (b) groups having the following formula:

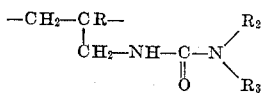

wherein R is a member selected from the class consisting of hydrogen and monovalent saturated aliphatic hydrocarbon radicals of not more than two carbon atoms, and $R_2$ and $R_3$ are members selected from the class consisting of hydrogen and hydrocarbon radicals of not more than 18 carbon atoms.

6. A polymeric polyurea having a main polymer chain consisting of contiguous carbon atoms and containing as recurring structural units (a) groups containing at least three contiguous carbon atoms of which one is extralinear and is directly connected by a single bond to an extralinear amino nitrogen having hydrogen attached thereto, the next two contiguous carbon atoms being an integral part of the main polymer chain, the remaining valence of said amino nitrogen being satisfied solely by a member selected from the class consisting of hydrogen and saturated aliphatic hydrocarbon radicals of 1 to 18 carbon atoms, each of said contiguous carbon atoms being saturated aliphatic and otherwise attached solely to members of the class consisting of hydrogen and monovalent saturated aliphatic hydrocarbon radicals of not more than two carbon atoms and (b) groups having the following formula

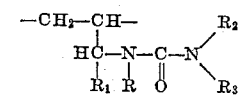

wherein $R_1$ is a member selected from the class consisting of hydrogen and methyl, R is a member selected from the class consisting of hydrogen and saturated aliphatic hydrocarbon radicals of 1 to 18 carbon atoms, and $R_2$ and $R_3$ are members selected from the class consisting of hydrogen and hydrocarbon radicals of not more than 18 carbon atoms.

7. A polymeric polyurea having a main polymer chain consisting of contiguous carbon atoms and containing as recurring structural units (a) groups containing at least three contiguous carbon atoms of which one is directly connected by a single bond to an extralinear amino nitrogen having its free valences satisfied solely by hydrogen, each of said contiguous carbon atoms being an integral part of the main polymer chain, being saturated aliphatic and otherwise attached solely to hydrogen, and (b) groups having the following formula:

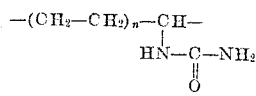

wherein $n$ is a positive integer from 1 to 150.

8. A polymeric polyurea having a main polymer chain consisting of contiguous carbon atoms and containing as recurring structural units (a) groups containing three contiguous carbon atoms of which one is extralinear and is directly connected by a single bond to an extralinear amino nitrogen having its free valences satisfied solely by hydrogen, the next two contiguous carbon atoms being an integral part of the main polymer chain, each of said three contiguous carbon atoms being saturated aliphatic and otherwise attached solely to hydrogen, and (b) groups having the following formula:

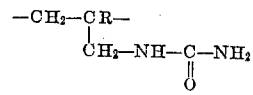

wherein R is hydrogen.

9. A polymeric polyurea having a main polymer chain consisting of contiguous carbon atoms and containing as recurring structural units (a) groups containing at least three contiguous carbon atoms of which one is extralinear and is directly connected by a single bond to an extralinear amino nitrogen having its free valences satisfied solely by hydrogen, the next two contiguous carbon atoms being an integral part of the main polymer chain, each of said contiguous carbon atoms being saturated aliphatic and otherwise attached solely to hydrogen, and (b) groups having the following formula:

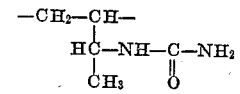

JOHN T. MAYNARD.

REFERENCES CITED

The following references are of record in the file of this patent:

UNITED STATES PATENTS

| Number | Name | Date |
|---|---|---|
| 2,114,292 | Fry | Apr. 14, 1938 |
| 2,326,287 | Coffman | Aug. 10, 1943 |
| 2,334,476 | Coffman | Nov. 16, 1943 |
| 2,400,016 | Meyer | May 7, 1946 |
| 2,467,832 | Jones | Apr. 19, 1949 |
| 2,527,821 | Johnson | Oct. 31, 1950 |
| 2,544,638 | Caldwell | Mar. 13, 1951 |